2,919,184
PROCESS FOR PRODUCING SUBSTANTIALLY PURE FREE-RUNNING UREA GRANULES

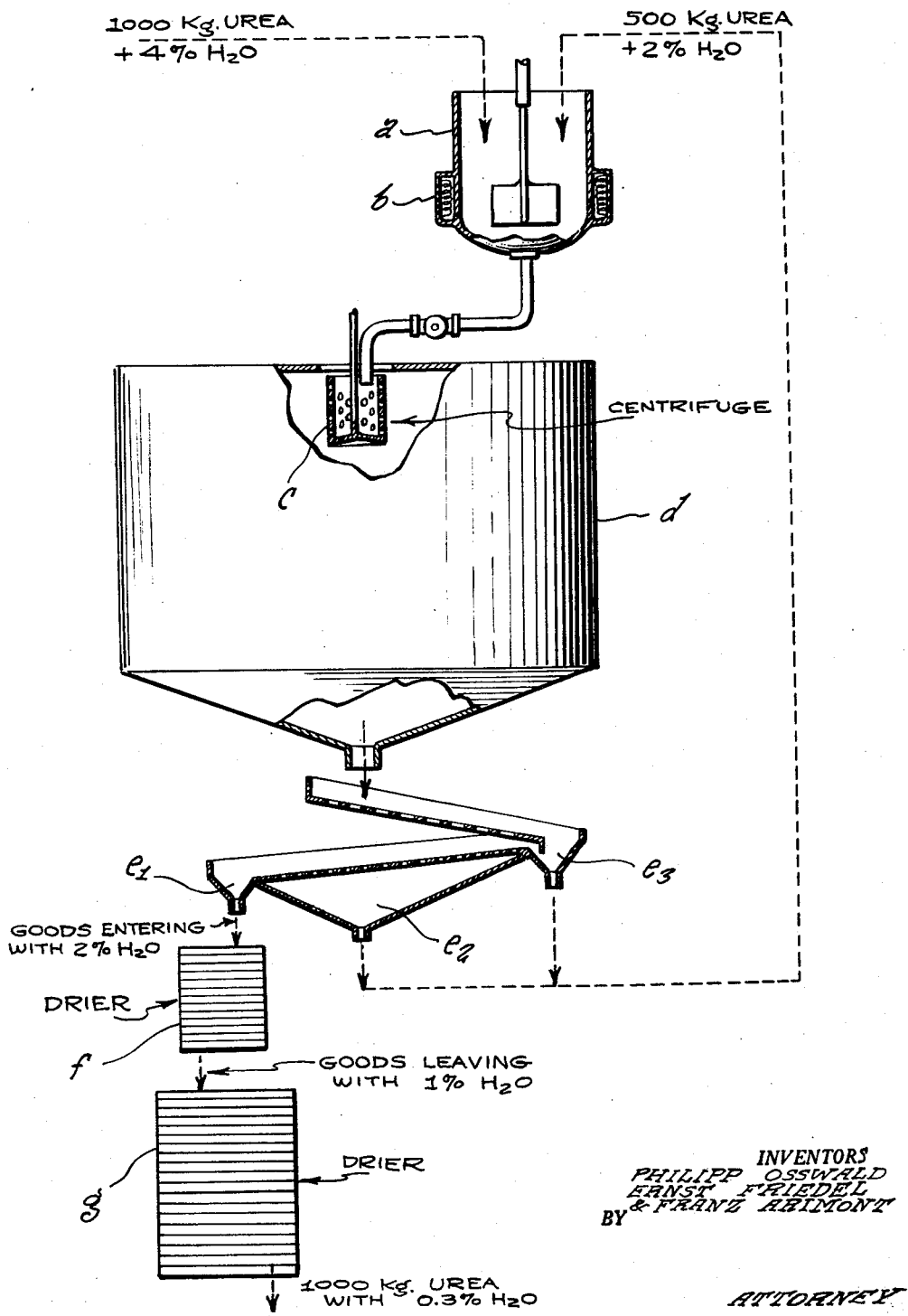

Philipp Osswald, Hofheim (Taunus), Ernst Friedel, Frankfurt am Main, Franz Arimont, Dortmund, and Ludwig Hill, Dortmund-Syburg, Germany, assignors to Inventa A.G. für Forschung und Patentverwertung, Zurich, Switzerland Application May 26, 1955, Serial No. 511,336

2 Claims. (Cl. 71—64)

The present invention relates to a process for producing urea.

Urea has recently acquired new importance for the use as fertilizer. Due to its high nitrogen content, urea is suitable for shipping over long distances and, for the same reason, is adapted for distribution from airplanes. For the latter purpose, a product has to meet high specifications as regards pouring capacity and evenness of structure; a moist, sticky product which is not completely globular, or is brittle or crystalline, would cause irregularities in distribution or clogging of the distributor nozzles. Furthermore, products of varying grain size do not distribute evenly when descending through moving air; the areas to be fertilized would only receive the product in irregular amounts.

When urea is prepared in solid form, some difficulties are encountered upon concentrating the aqueous solution, due to hydrolysis and evolution of ammonia. Therefore, it is conventional only to make solutions of 70 to 90% urea and to spray them while they meet rising hot air in a tower, thereby obtaining a mash of crystalline needles and mother liquor.

Thereafter, the mass is evaporated to a concentration of 90 to 95%, then sprayed on rotating discs and atomizer nozzles, whereby a gritty product with 4% water is obtained. Sometimes a pearly product is obtained of varying size. When the melt is evaporated to more than 95%, decomposition will set in, so that a stronger concentration is impossible. Only with the addition of larger amounts of foreign substances, for instance ammonium phosphate, is it, up to the present, possible to obtain melts with a lower water content.

The drying of solid urea is very difficult when a pearly mass is used. The difficulties are caused by the fact that water can only escape by slow diffusion from the melt solidified to a pearly mass, and that high temperatures have to be avoided due to the risk of remelting and decomposition. It was therefore very desirable to devise a process by which drying by atomizing could be performed with better results, that is to say, leading to higher concentrations than heretofore, by starting with a urea product of higher urea content.

According to the present invention, a urea product which is free running and resistant to tropical climate can be obtained in the form of evenly round pearls of equal size by spraying a hot melt in a chamber against ascending cooling air with subsequent drying of the atomized product, by using a melt a mass which contains at least 96% of urea, into which was passed a mixture of pre-dried fine- and coarse-grain urea resulting from a previous stage of the production. No foreign substance is introduced into the melt. There is a difference as regards the prevention of decomposition, whether the concentration of the melt is performed by evaporation or by introduction of dry material.

Further processing occurs, preferably, by feeding the melt containing at least 96% urea, to a wire contrifuge of known construction with mesh openings of 2–3 mm. In this way, a spray of pearls is obtained, which is of surprising regularity in shape and size. Yields of at least 75% are obtained in desired grain size of 0.75 to 2 mm. The grains have a smooth, globular surface without pores. About ¼ of the material is returned to the melt as fine and coarse grain which serves as the above mentioned addition.

A small grain size of 0.75 to 2 mm. is desirable in view of the subsequent drying process. The drying of the pearly goods is an unusually protracted procedure because water contained in a homogeneously solidified melt, can only be removed by slow diffusion. The drying of a pearly mass having a grain size from 0.75 to 2 mm. takes, for instance, 7 hours to a residual water of 1% and 4 days to a water content of 0%, when drying is carried out in a stationary material at 80° C. Larger pearls are correspondingly more difficult to dry. It should also be considered that the drying temperature has an upper limit, in view of the danger of superficial fusion. However, drying can be carried out more rapidly when the material to be dried is highly concentrated to start with.

The difficulties of drying pearly urea led to the fact that up to now no attempt was made to dry the product to a water content of less than 1%. This is an inconvenience since the otherwise excellent properties of a pearly product with its superior pouring capacity can only be fully utilized when the water content is less than 0.5%.

The very surprising discovery has now been made that a pearly urea, which has been dried to a water content of 0.3% will not absorb any water even under tropical conditions, i.e. 40° C. and 80% relative humidity. What has been said about the difficulties of diffusion in eliminating the water, likewise applies to prevent the penetration of water to the inside. In order to succeed in drying the product to a water content below 0.5%, it is suggested according to the invention to perform the drying of the products made according to the invention in drying apparatus designed for a long period of stay and provided with efficient equipment for turning over the material. A multiple-story drier has proved effective for this purpose, when equipped with efficient devices for air circulation; such multiple-story driers do not show any gradation in temperature, as found in drying drums. It is therefore advantageous, when processing pearly urea, to arrange two such drying apparatus in series in such a manner that, for instance in the first apparatus drying is carried out from a water content of 2.5% $H_2O$ to 1% $H_2O$ at 80° C., whereas in the second apparatus, the product is dried from 1% $H_2O$ to 0.3% $H_2O$, at 100° C. In construction, the two stages can be combined in one building. The fine and coarse grains are easily removed in the intermediate stage, or in the final stage, and are returned into the melt. By treating in this manner, the entire pearly product, dried to 0.5% and strained, has become resistant to atmospheric influence.

In order to avoid an agglomeration with absolute certainty, even upon extended storage, it is desirable to add 1 to 3% of dry kieselguhr, if desired in colored form; the product so obtained will be of a shape useful for any later application.

The present application will now be more fully described in an example, but it should be understood that this is given by way of illustration and not of limitation, and that many changes in the details will be made without departing from the spirit of the invention.

*Example*

1,000 kg. of a urea melt containing 4% $H_2O$, are mixed with 250 kg. pre-dried pearly product, whereby a melt is obtained having an $H_2O$ content of 3.4%. This melt is subjected to centrifuging in a wire contrifuge of 300 mm.

diameter with openings of 2 to 3 mm., rotating at 600 r.p.m. The temperature is maintained at 127° C. The centrifuge is disposed in the ceiling of a spraying chamber of 20 meters height and 20 meters in diameter. 10 tons of melt are sprayed per hour. The sprayed product is obtained throughout in a pearly shape of perfect roundness. By sieving, 6.2% are contained as fine grain of 0.75 mm. diameter, 16.5% as coarse grain with over 2 mm. diameter, so that 77.3% will be in useful shape as pearly product for the desired purpose. The product obtains still 2.0 to 2.5% $H_2O$ (water determined after the iodine-pyridin method). The product is fed to a multiple-story drier with high air circulation. When a temperature of 80° C. is maintained in the drying air, after one hour a drying effect is obtained which leaves 1% of $H_2O$ in the product. The urea is then subjected to a second drying at a temperature of 100°C.; passage is adjusted to 3 hours in the second stage. The material will then be discharged with a water content of 0.3% $H_2O$. The exhaust gas smells faintly of $NH_3$. The dried material is sieved for grain size 0.85 to 2 mm. and mixed with 3% of dry powdered kieselguhr.

The process according to the invention will now be described with reference to the accompanying flow-sheet, which is given by way of illustration and not of limitation.

The flow-sheet shows a melting vessel $a$ with a heating jacket $b$. In this vessel, 1,000 kg. of urea melt of a water content of 4% $H_2O$ are mixed with 500 kg. pre-dried pearly material with a water content of 2% $H_2O$; the melt thereby obtained contains 3.3% $H_2O$.

From the vessel $a$, the melt is passed at a temperature of 127° C. into a wire centrifuge having a diameter of 300 mm. with openings of 2 mm.–4 mm.; the wire cage rotates at an r.p.m. of 600. The centrifuge is arranged in the top of a spraying chamber $d$ which is 20 m. high and 20 m. in diameter. Ten tons of melt are sprayed during one hour. The entire material sprayed is obtained in pearly form and is separated by sieving into a fine grain portion comprising 11% of pearls with a diameter below 1 mm., and a coarse grain portion comprising 22% with a diameter above 2 mm. The fine portion is collected in a container $e_2$ and the coarse portion in a container $e_3$. The total amounts to about 500 kg. urea dried to a water content of 2% $H_2O$, which is returned to vessel $a$. A calculation shows that in this way half of the total evaporation of water has been transferred to the spraying chamber.

The remaining sieve portion $e_1$ comprises about 67% of the sprayed goods in the form of useful pearled material with a diameter between 1 and 2 mm. and a water content of 2% $H_2O$. These goods are transferred to a multiple-story drier $f$ with intense air circulation. The air temperature is maintained at 80° C. and after one hour's stay in the drier, the material will have been dried down to a water content of 1% $H_2O$. The goods are then transferred to a second drying stage in a drier $g$ where a temperature of 100° C. is maintained and the drying period is 3 hours. The gases escaping at the bottom have a faint odor of $NH_3$. The dry material now contains only 0.3% of water. It is powdered with 2–3% of kieselguhr and is then excellently stable to air and storage.

What we claim is:

1. A process for producing a substantially pure free-running urea for use as a fertilizer which is resistant to tropical climate in the form of globules having a size of 0.75 to 2 mm. and a final water content of less than 0.5 percent, which consists of mixing urea of at least 96 percent purity and a maximum water content of 4 percent with a pre-dried mixture of fine-grain urea of a size up to 0.75 mm. and of coarse grain urea having a size larger than 2 mm., both of lower water content and obtained in a previous stage of production, thereby lowering the water content of said first-mentioned urea by approximately 1 percent, melting said mixture, spraying said hot melt of said urea mixture in a chamber against ascending cooling air to obtain regularly shaped globules of which at least 75 percent have a size of 0.75 to 2 mm., and finally drying the globules thus formed to attain the desired low water content of less than 0.5% and recycling the oversize and undersize globules.

2. A process according to claim 1, wherein the drying is carried out in a first stage at a temperature of 80° C. and in a second stage at a temperature of 100° C.

References Cited in the file of this patent

UNITED STATES PATENTS

| | | |
|---|---|---|
| 847,749 | Ellis | Mar. 19, 1907 |
| 1,951,518 | Meiser | Mar. 20, 1934 |
| 2,008,469 | Prince | July 16, 1935 |
| 2,644,806 | Kise | July 7, 1953 |
| 2,693,403 | Brumbaugh et al. | Nov. 2, 1954 |
| 2,774,660 | Cook et al. | Dec. 18, 1956 |